UNITED STATES PATENT OFFICE.

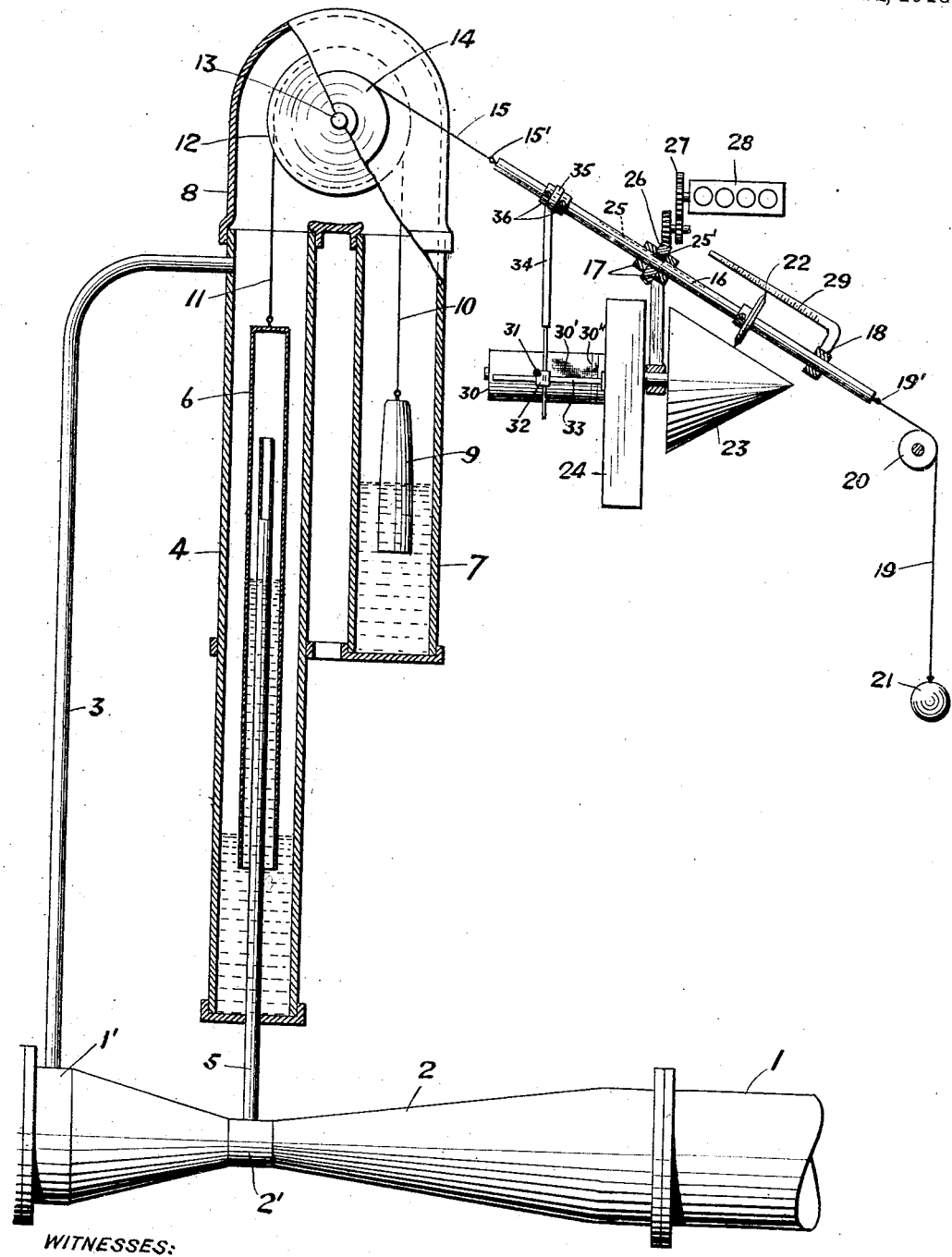

JOHN W. LEDOUX, OF SWARTHMORE, PENNSYLVANIA.

LIQUID-METER.

1,050,148.

Specification of Letters Patent.   Patented Jan. 14, 1913.

Application filed January 24, 1910. Serial No. 539,701.

*To all whom it may concern:*

Be it known that I, JOHN W. LEDOUX, a citizen of the United States, residing at Swarthmore, in the county of Delaware and State of Pennsylvania, have invented certain Improvements in Liquid-Meters, of which the following is a specification.

This invention is a meter having improved means for differentiating liquid pressures and therefrom integrating and recording the flow of the liquid.

In the preferred construction embodying my invention, a float is formed, balanced and connected to move, with changes in the rate of flow of the liquid to be measured, so that the movement and the change of rate shall be in a simple ratio and this movement is communicated to integrating and recording mechanism.

The characteristics of my improvements are fully disclosed in the following description and the accompanying drawing in illustration thereof.

The drawing represents a partial sectional elevation of apparatus embodying my improvements.

As illustrated, the conduit 1, provided with a Venturi section 2, has its normal section 1' connected by a tube 3 with the top of a pressure chamber 4 and the throat 2' of its Venturi section connected by a tube 5 with the interior of a float 6 (having the form of an inverted vessel with thin walls) in the chamber 4; the tube 5 passing through the closed bottom of the chamber and the open bottom of the float 6 to a point above the level to which mercury, in the chamber 4, rises.

A chamber 7, containing mercury, has its top connected with the top of the chamber 4 by the casing 8. A peculiarly shaped float 9, within the chamber 7, is connected with the float 6 by the cords 10 and 11 connected with the sheave 12 which is revoluble in the casing 8. The sheave 12 is fixed on a shaft 13 which is journaled in the walls of the casing 8 and has fixed thereon, exterior to the casing, a sheave 14. Connected with the sheave 14 is a cord 15 having a swiveled connection 15' with one end of a rod 16, which is revoluble in and movable longitudinally through bearings 17 and 18, the outer end of the rod being connected by a swivel 19' with the cord 19 which passes over a sheave 20 and carries a weight 21.

A disk 22 is fixed on the shaft 16 and is adapted to be moved thereby between the apex and the base of a cone 23 with the surface of which it makes contact, the cone being revolved at a constant rate by a clock 24 and revolving the shaft through the disk. The shaft 16 is movable longitudinally through and revolves (by means of a groove 25 and key 25') a gear wheel 26, which is journaled in the bearing 17 and revolves a gear train 27 of a register 28 for indicating the total flow.

A scale 29, carried by the bearing 18, coacts with the disk 22 to indicate the rate of flow.

A cylinder 30, adapted for carrying a sheet 30' for receiving a record, is revolved at a constant rate by the clock 24. Record sheet 30' carried by the cylinder is acted upon by a marker 31 fixed to a collar 32 which is movable on a stationary guide 33 parallel to the axis of the cylinder. An arm 34 is provided with a collar 35 within which the rod 16 revolves, collars 36 being fixed to the rod whereby the longitudinal movement of the latter is communicated to the arm. The reduced lower end of the arm 34 engages and moves through the collar 32. Consequently the longitudinal movement of the rod 16 translates the arm 34, the collar 32 and the marker 31, which makes a record on the recording sheet showing the flow.

In operation, when there is no flow of the liquid in the conduit, the pressure (as of water or other fluid lighter than mercury) communicated through the tube 3 to the surface of the mercury in the chamber 4 exterior to the float 6 will be equal to the pressure communicated through the tube 5 to the surface of the mercury in the float 6, so that the mercury in the chamber 4 within and without the float 6 will stand at the same level. As the pressure of the liquid in the chamber 4 upon the top of the float 6 is substantially the same per unit of area as the oppositely acting pressure within the float, the latter will be pushed down into the mercury only slightly by the excess of pressure due to the slightly greater area of the exterior than of the interior of the closed top of the float. The weight of the float 6 is counterbalanced primarily by the variable force exerted by the float 9 immersed to a greater or less extent in mercury and by the constant force exerted by the weight 21 acting through the mechanism connecting it with the sheave 14. With substantially equal pressures within and without the float 6, it exerts the minimum tension on the cord 11 connecting it with the sheave 14, the float 9 falls to its position of greatest submergence in the mercury in the chamber 7, and the shaft 16, acting under the influence of the weight 21, moves the disk 22 to the apex of the cone 23 and the marker 31 to the datum line 30'' indicating no flow. In this position the disk receives no motion from the constantly rotating cone 23, consequently the register 28 is inactive. As the flow in the conduit 1 rises, greater pressure is communicated through the tube 3 than through the tube 5, the pressure exterior to the float 6 is greater per unit of area than the interior pressure (so that the surface of the mercury within the float rises as that without falls) and the float moves downward against the increasing resistance of the float 9 as it is caused to rise from the mercury in the chamber 7. The shape of the float 9 is such that the force with which it acts against the float 6 varies in a simple proportion with relation to the rate of flow, so that the movement will be a simple proportion of the change in the rate of flow in the conduit. Consequently the graduations of the scale 29 are uniform and the position of the disk 22 with relation thereto will indicate the rate of flow. As the movement of the floats, due to the rise in flow in the conduit, effects the movement of the disk 22 a proportionate distance from the apex of the cone 23 toward its base, the disk and the mechanism by which it is connected with the register are revolved at a rate which is a function of the rate of flow, hence the register will indicate the total flow. The movement of the floats will also effect the movement of the marker 31 a distance which is a simple proportion of the distances traveled by the floats, consequently the record made by the marker upon the constantly moving sheet 30' carried by the cylinder 30 will indicate the flow at different periods.

Having described my invention, I claim:

1. In a liquid meter, in combination with a conduit adapted for conveying a liquid, a chamber, a hollow float in said chamber, said float having an opening adapted to be sealed by a liquid in said chamber, means for communicating pressure from the liquid in said conduit to the interior of said chamber exterior to said float, means for communicating pressure from liquid in said conduit to the interior of said float, and counter-balancing means offering a variable resistance to the movement of said float whereby its movements due to changes in the rate of flow in said conduit are a simple proportion of the changes in such rate of flow.

2. In a liquid meter, in combination with a conduit adapted for conveying a liquid to be measured, a chamber, a hollow float in said chamber, said float having an opening adapted to be sealed by a liquid heavier than that to be measured, means comprising a shaft with which said float is connected, a second chamber adapted for containing a liquid, a float in said second chamber adapted to be submerged to a greater or less extent by liquid therein, said second float being connected with said means, to control the movements of said float first named, mechanism connected with said means and reciprocating under control of said floats, a revoluble traction member carried by said mechanism, a member revoluble at a constant rate by which said traction member is revolved at a rate variable with its position, and integrating mechanism operating under control of said traction member.

3. In a liquid meter, in combination with a conduit having means connected therewith for differentiating the pressure of a liquid flowing therein, of a casing, a pair of chambers communicating through said casing and containing a liquid heavier than that to be measured, a hollow float in one of said chambers, said float having an open bottom sealed by said heavier liquid, a float in the other of said chambers, a journaled sheave in said casing, means whereby said floats are connected with said sheave, a duct whereby liquid pressure is communicated from said conduit to said chambers above said heavier liquid exterior to said hollow float and a duct whereby different liquid pressure is communicated from said conduit to the interior of said hollow float above said heavier liquid.

In witness whereof I have hereunto set my name this 22 day of January, 1910, in the presence of the subscribing witnesses.

JOHN W. LEDOUX.

Witnesses:
Jos. G. Denny, Jr.,
Robert James Early.